(12) United States Patent
Nadeau

(10) Patent No.: US 11,679,638 B2
(45) Date of Patent: Jun. 20, 2023

(54) SHOCK ABSORBER

(71) Applicant: 9176 7590 Québec Inc., Québec (CA)

(72) Inventor: Jimmy Nadeau, Québec (CA)

(73) Assignee: 9176 7590 Quebec Inc., Quebec (CA)

( * ) Notice: Subject to any disclaimer, the term of this patent is extended or adjusted under 35 U.S.C. 154(b) by 189 days.

(21) Appl. No.: 16/923,851

(22) Filed: Jul. 8, 2020

(65) Prior Publication Data
US 2021/0170824 A1 Jun. 10, 2021

Related U.S. Application Data

(60) Provisional application No. 62/944,800, filed on Dec. 6, 2019.

(51) Int. Cl.
*B60G 17/00* (2006.01)
*F16F 9/19* (2006.01)
(Continued)

(52) U.S. Cl.
CPC ............. *B60G 17/00* (2013.01); *B60G 13/08* (2013.01); *F16F 9/19* (2013.01); *F16F 13/007* (2013.01); *B60G 15/062* (2013.01); *B60G 2202/24* (2013.01); *B60G 2202/312* (2013.01); *B60G 2204/12* (2013.01); *B60G 2204/44* (2013.01); *B60G 2204/61* (2013.01); *B60G 2206/41* (2013.01); *B60G 2500/30* (2013.01); *B60G 2600/04* (2013.01); *B60G 2600/20* (2013.01);
(Continued)

(58) Field of Classification Search
CPC .... B60G 17/00; B60G 13/08; B60G 2202/24; B60G 2202/312; B60G 2204/12; B60G 2204/44; B60G 2204/61; B60G 2206/41; B60G 2500/30; B60G 2600/04; B60G 2600/20; B60G 2800/162; B60G 2204/129; F16F 2222/12; F16F 2230/0047; F16F 2230/186; F16F 9/3264; F16F 9/19; F16F 13/007
See application file for complete search history.

(56) References Cited

U.S. PATENT DOCUMENTS

| | | | | |
|---|---|---|---|---|
| 854,351 A | * | 5/1907 | Hight | ........................ B25H 7/04 33/42 |
| 1,318,591 A | * | 10/1919 | Radlein | ................... F16C 23/04 384/205 |

(Continued)

FOREIGN PATENT DOCUMENTS

| CN | 107415619 A | 12/2017 |
|---|---|---|
| CN | 209008331 U | 6/2019 |

*Primary Examiner* — Paul N Dickson
*Assistant Examiner* — Timothy Wilhelm
(74) *Attorney, Agent, or Firm* — Agence de Brevets Fournier

(57) ABSTRACT

A shock absorber includes i) a hollow base defining an axial direction and having a first mounting portion, ii) an outer axial tube, having first and second longitudinal ends, and being coaxially mounted into the hollow base via its first longitudinal end so as to allow adjusting a distance of the second longitudinal end relative to the base; and iii) an inner axial tube slidably mounted into the outer axial tube therein; the inner axial tube having a second mounting portion. The hollow tube has an opening therein that defines a window to allow visualizing a part of the outer axial tube therethrough which includes the first longitudinal end thereof.

11 Claims, 4 Drawing Sheets

(51) Int. Cl.
    *F16F 13/00*           (2006.01)
    *B60G 13/08*          (2006.01)
    *B60G 15/06*          (2006.01)

(52) U.S. Cl.
    CPC .... *B60G 2800/162* (2013.01); *F16F 2222/12* (2013.01); *F16F 2230/0047* (2013.01); *F16F 2230/186* (2013.01)

(56) References Cited

U.S. PATENT DOCUMENTS

| | | | | |
|---|---|---|---|---|
| 1,494,001 A * | 5/1924 | Mcpherson | B60C 23/0496 73/146.8 |
| 1,654,763 A * | 1/1928 | Tauscher | F16F 7/06 188/129 |
| 1,950,882 A * | 3/1934 | Gianini | B60T 11/04 267/71 |
| 2,540,525 A * | 2/1951 | Howarth | F16F 1/12 248/542 |
| 2,625,585 A * | 1/1953 | Krouse | G01B 7/105 33/DIG. 1 |
| 2,697,600 A * | 12/1954 | Gregoire | F16F 1/125 267/287 |
| 2,749,505 A * | 6/1956 | Mcnary | G01B 7/105 335/219 |
| 2,799,089 A * | 7/1957 | Banker | G01F 23/04 33/722 |
| 2,995,327 A * | 8/1961 | Wood | F16L 3/2053 267/71 |
| 3,033,590 A * | 5/1962 | Statler | B60G 17/0152 267/286 |
| 3,197,188 A * | 7/1965 | Moore | E02F 3/8157 172/794 |
| 3,354,991 A * | 11/1967 | Kenworthy | F16F 7/08 188/67 |
| 3,885,777 A * | 5/1975 | de Carbon | F16F 9/092 267/64.19 |
| 3,891,199 A * | 6/1975 | Willich | F16F 9/16 188/289 |
| 4,020,929 A * | 5/1977 | Goldin | F16F 9/54 403/362 |
| 4,103,881 A * | 8/1978 | Simich | F16F 1/128 248/623 |
| 4,261,446 A * | 4/1981 | Bolger | F16F 9/54 188/322.19 |
| 4,297,765 A * | 11/1981 | Altman | A22C 25/02 401/289 |
| 4,339,850 A * | 7/1982 | Altman | A22C 25/02 401/289 |
| 4,433,290 A * | 2/1984 | Koch | G01B 7/34 324/230 |
| 4,744,444 A * | 5/1988 | Gillingham | F16F 9/512 267/221 |
| 4,783,882 A * | 11/1988 | Frolov | E05F 3/00 16/72 |
| 4,784,114 A * | 11/1988 | Muckler | F24C 15/20 126/299 R |
| 4,830,395 A * | 5/1989 | Foley | B60G 17/0272 280/124.162 |
| 4,836,578 A * | 6/1989 | Soltis | G01B 7/02 280/6.15 |
| 4,930,340 A * | 6/1990 | Evans | B60G 17/01933 73/1.81 |
| 4,962,834 A * | 10/1990 | Miner | B60G 15/067 267/221 |
| 5,006,799 A * | 4/1991 | Pfanstiehl | G01B 7/105 324/230 |
| 5,044,614 A * | 9/1991 | Rau | B60G 17/021 267/221 |
| 5,129,148 A * | 7/1992 | Adams | F16C 7/026 29/898.15 |
| 5,265,484 A * | 11/1993 | Babbitt, II | G01D 11/20 73/866.5 |
| 5,371,598 A * | 12/1994 | Ghaem | G01D 5/347 356/617 |
| 5,803,443 A * | 9/1998 | Chang | B60G 17/021 267/221 |
| 5,954,318 A * | 9/1999 | Kluhsman | B60G 11/16 267/221 |
| 5,961,106 A * | 10/1999 | Shaffer | B60G 13/008 267/221 |
| 6,382,645 B1 * | 5/2002 | Gravelle | B60G 15/068 280/86.752 |
| 6,405,445 B1 * | 6/2002 | Ford | G01B 5/061 33/608 |
| 6,569,203 B1 * | 5/2003 | Keller | A61F 2/389 623/23.45 |
| 6,698,559 B1 | 3/2004 | Liou et al. | |
| 6,827,184 B1 * | 12/2004 | Lin | B60G 11/15 267/221 |
| 6,902,045 B2 * | 6/2005 | Oliver | B60G 17/021 267/64.11 |
| 7,025,343 B2 * | 4/2006 | Chou | F16F 1/041 267/255 |
| 7,159,699 B1 * | 1/2007 | Tine, Jr. | F16F 9/56 188/282.4 |
| 7,216,861 B1 * | 5/2007 | LaBarbera | F16F 9/38 267/221 |
| 7,293,764 B2 * | 11/2007 | Fang | B60G 17/021 267/220 |
| 7,350,628 B2 * | 4/2008 | Adoline | F16F 9/56 188/67 |
| 7,448,478 B2 * | 11/2008 | Thomas | B60G 15/07 267/140.3 |
| 7,537,225 B2 * | 5/2009 | Ryshavy | B60G 15/068 280/124.147 |
| 7,922,181 B2 * | 4/2011 | Hakui | B60G 17/052 280/5.514 |
| 8,070,171 B2 * | 12/2011 | Wohlfarth | B60G 15/063 267/221 |
| 8,113,322 B2 * | 2/2012 | Arnott | F16F 9/43 188/298 |
| 8,573,573 B2 * | 11/2013 | Michel | F16F 9/56 267/225 |
| 8,616,352 B2 * | 12/2013 | Hinouchi | B60G 17/021 267/222 |
| 8,702,075 B1 * | 4/2014 | Moorefield | F16F 1/121 267/221 |
| 8,732,905 B2 * | 5/2014 | Bell | E05F 3/102 16/DIG. 39 |
| 8,967,601 B2 * | 3/2015 | Ozaki | B60G 15/067 267/221 |
| 9,140,325 B2 * | 9/2015 | Cox | B60G 17/021 |
| 9,174,504 B1 * | 11/2015 | Powell | B60G 7/006 |
| 9,211,775 B1 * | 12/2015 | Ryshavy | F16F 1/121 |
| 9,695,620 B2 * | 7/2017 | Zasowski | E05F 1/105 |
| 9,714,688 B2 * | 7/2017 | Chu | F16F 1/122 |
| 9,821,623 B1 * | 11/2017 | Liao | F16F 9/065 |
| 9,844,993 B2 * | 12/2017 | Botello | B60G 17/021 |
| 9,869,360 B2 * | 1/2018 | Smith | F16B 37/0892 |
| 9,914,335 B1 * | 3/2018 | Lin | B60G 17/021 |
| 10,072,724 B2 * | 9/2018 | Haugen | B62K 25/08 |
| 10,345,122 B2 * | 7/2019 | Gardynik | G01D 11/245 |
| 2011/0232147 A1 * | 9/2011 | Zoellner | F41C 9/085 42/1.01 |
| 2011/0298168 A1 * | 12/2011 | Groebner | F16F 1/121 267/217 |
| 2012/0248666 A1 * | 10/2012 | DeBruler | B60G 15/12 267/64.24 |
| 2016/0121686 A1 * | 5/2016 | Botello | B60G 17/021 280/6.157 |
| 2019/0075926 A1 * | 3/2019 | Sekine | F16F 9/435 |

* cited by examiner

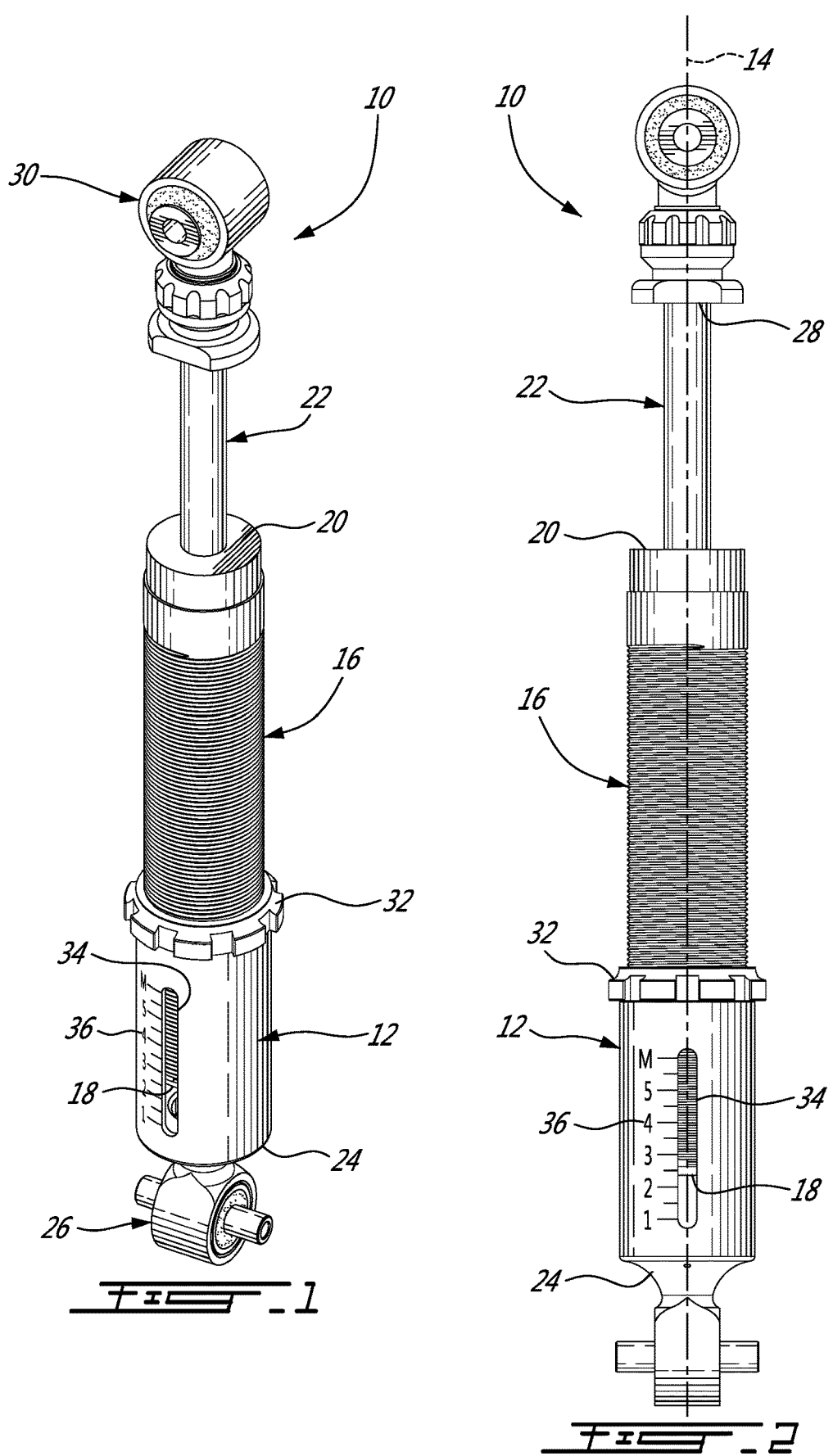

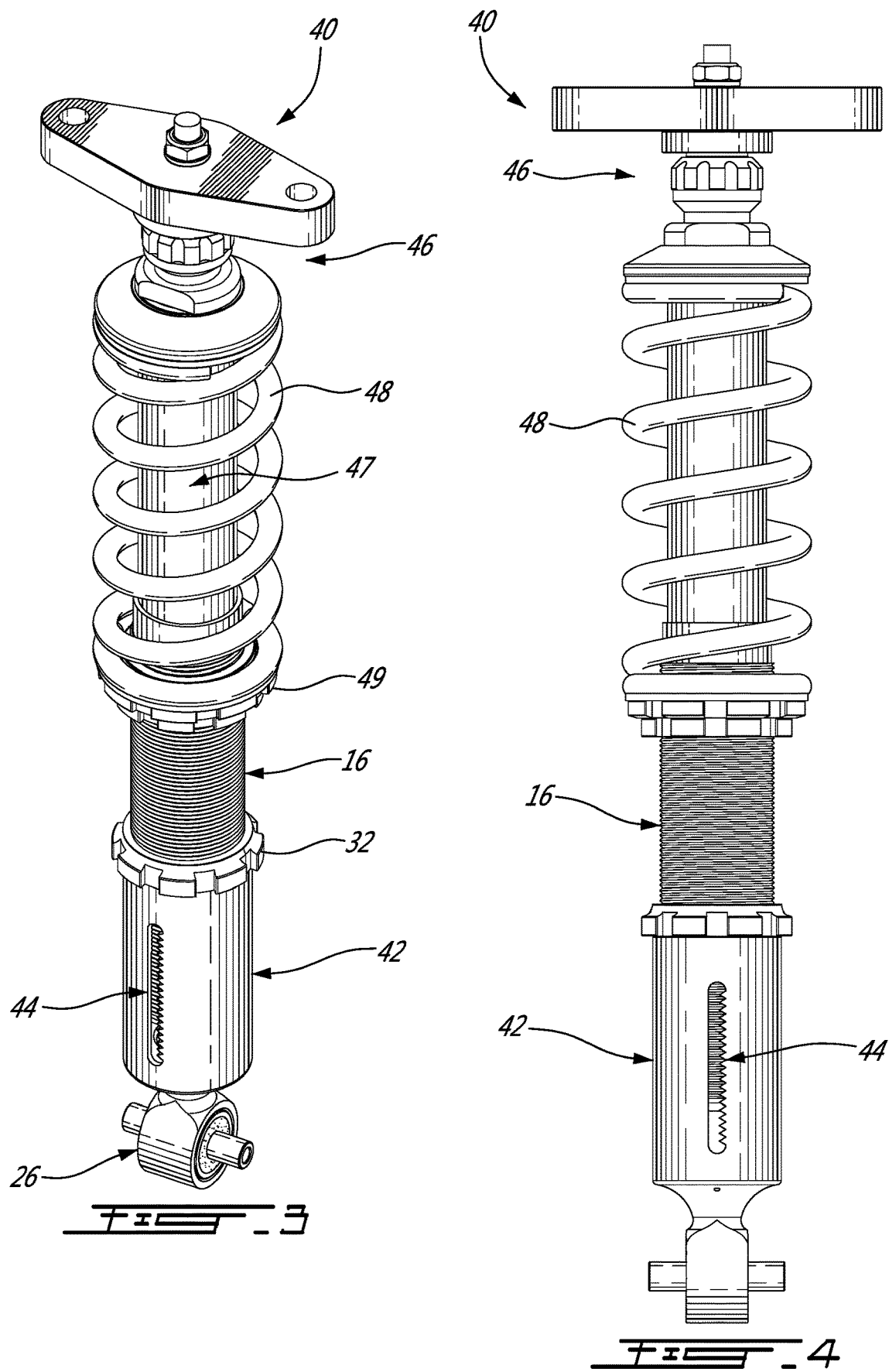

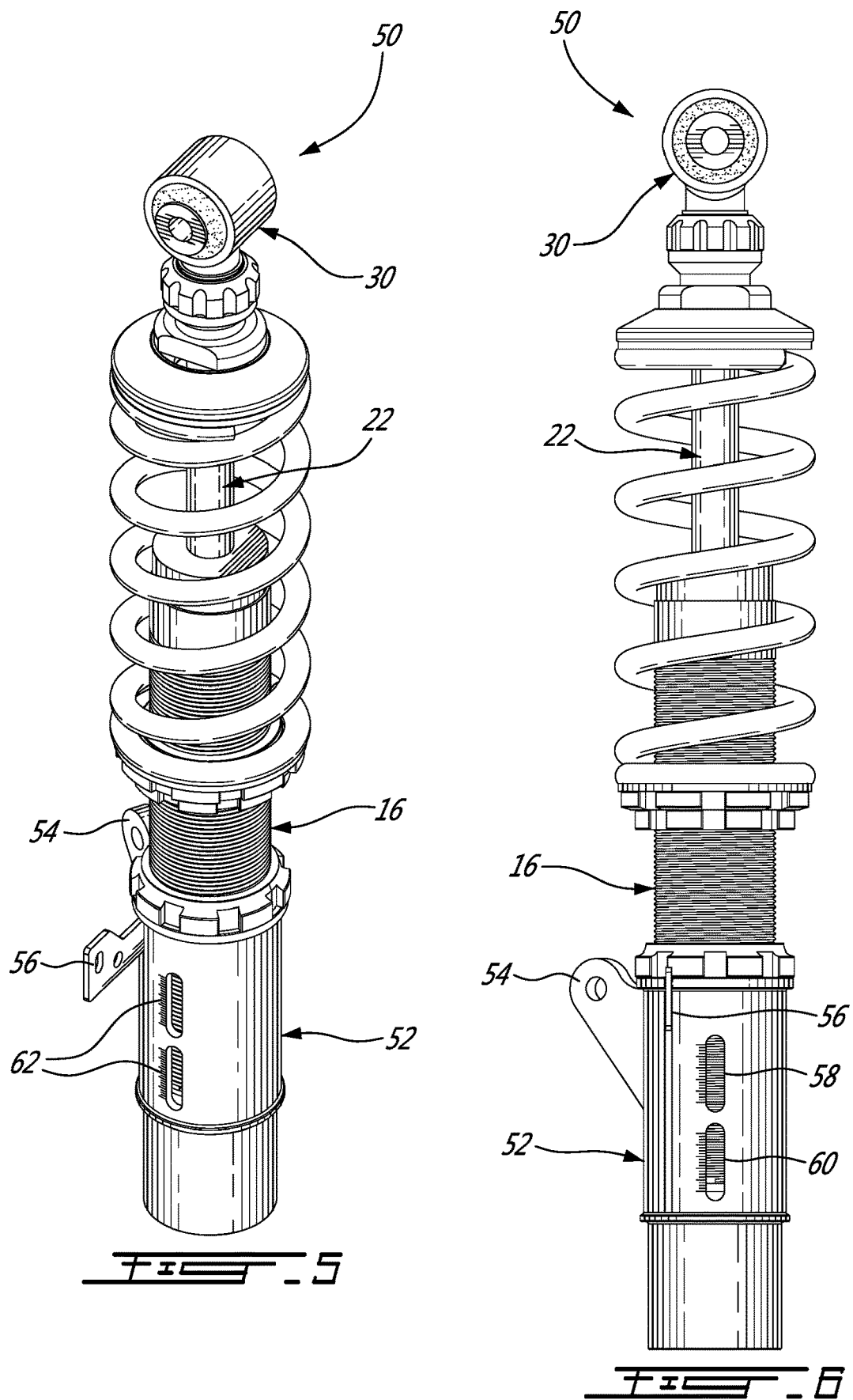

SHOCK ABSORBER

CROSS REFERENCE TO RELATED PATENT APPLICATION

This application claims the benefit of U.S. Provisional Application No. 62/944,800, filed on Dec. 6, 2019, the content of which is incorporated by reference herein.

FIELD

The present disclosure generally relates to shock absorber.

BACKGROUND

As it is well known in the art, the height of an automobile can be adjusted via the mounting of the shock absorbers thereof. Indeed, some shock absorbers have a rode that can be retracted in a jacket to adjust the overall height of the shock absorber.

Even for a skilled mechanic, it can be tedious to adjust the four wheels to a same height and repetitive height measurements must be taken before obtaining the desired adjustment. Indeed, conventional adjustable shock absorbers do not include a scale or any other reference indicating a safety adjustment limit.

Shock absorbers are known that includes a threaded rod mounted in a threaded tube, wherein the threaded rod includes a flat portion provided with scales as reference for the height adjustment. An example of such a system is described in U.S. Pat. No. 6,827,184, issued on Dec. 7, 2004 to Lin and titled "Shock-Absorbing Device of an Automobile".

A problem with such an adjustment mechanism is that water, sand and salt are allowed to infiltrate between the threaded rod 50 and the threaded tube 60, causing corrosion of the threads and potential breakage of the tube 60.

BRIEF DESCRIPTION OF THE DRAWINGS

In the appended drawings:

FIG. 1 is a front perspective of a shock absorber according to a first illustrative embodiment;

FIG. 2 is a front view of the shock absorber from FIG. 1;

FIG. 3 is a front perspective of a shock absorber according to a second illustrative embodiment;

FIG. 4 is a front view of the shock absorber from FIG. 3;

FIG. 5 is a front perspective of a shock absorber according to a third illustrative embodiment;

FIG. 6 is a front view of the shock absorber from FIG. 5; and

SUMMARY

Figure 7:
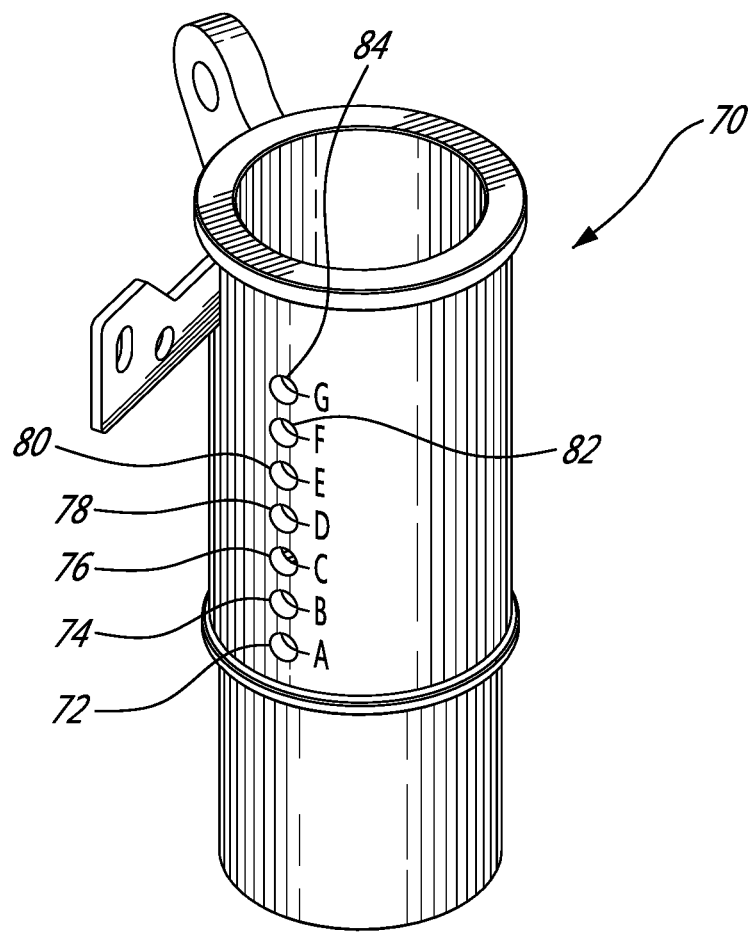
FIG. 7 is a front perspective of a base for a shock absorber according to a fourth illustrative embodiment.

According to illustrated embodiments, there is provided a shock absorber comprising:

a hollow base defining an axial direction; the hollow base having a first mounting portion;

an outer axial tube, having first and second longitudinal ends, and being coaxially mounted into the cylindrical hollow base via its first longitudinal end so as to allow adjusting a distance of the second longitudinal end relative to the base; and an inner axial tube slidably mounted into the outer axial tube therein; the inner axial tube having a second mounting portion;

wherein the hollow base has at least one opening therein, defining a window to allow visualizing a part of the outer axial tube therethrough which includes the first longitudinal end thereof.

According to other illustrated embodiment, there is provided a base for mounting to a vehicle a shock absorber of the type having a threaded outer cylinder, the base comprising: a body having i) a mounting portion for securing the body to the vehicle, ii) a cylindrical hollow portion having a threaded inner surface, and iii) an opening in the cylindrical hollow portion that defines an access thereto for screwing the threaded outer cylinder therein; the cylindrical hollow portion having a window for visualizing the threaded cylinder therein.

Such a base allows visualizing the shock absorber, and more particularly the outer threaded tube thereof, and thus knowing the adjustment limit. Knowing such a limit allows preventing the inner tube from disembarking unintentionally from the outer tube.

Moreover, such a base prevents water, sand, and salt from entering the between the inner and outer tubes of the shock absorber, which might prevent the separation thereof and/or further length adjustment of the shock absorber. Any liquid or debris entering the visualization window would exit without causing damage to the shock absorber or more precisely to its adjustment mechanism. Other objects, advantages and features of the shock absorber and of a base for mounting a shock absorber to a vehicle will become more apparent upon reading the following non-restrictive description of preferred embodiments thereof, given by way of example only with reference to the accompanying drawings.

DETAILED DESCRIPTION

In the following description, similar features in the drawings have been given similar reference numerals, and in order not to weigh down the figures, some elements are not referred to in some figures if they were already identified in a precedent figure. Herein, it shall further be noted that, for avoiding unnecessary details obscuring the invention, only device structures and/or processing steps closely relevant to schemes according to the invention are shown in the accompanying drawings while omitting other details less relevant to the invention.

The use of the word "a" or "an" when used in conjunction with the term "comprising" in the claims and/or the specification may mean "one", but it is also consistent with the meaning of "one or more", "at least one", and "one or more than one". Similarly, the word "another" may mean at least a second or more.

As used in this specification and claim(s), the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, un-recited elements.

A first illustrative embodiment of a shock absorber 10 will now be described with reference first to FIGS. 1 and 2.

The shock absorber 10 comprises a cylindrical hollow base 12, defining an axial direction 14, an outer threaded tube 16, having first and second longitudinal ends 18 and 20, and being screwed into the cylindrical hollow base 12 via its first longitudinal end 18; and an inner cylindrical tube 22 coaxially and slidably mounted into the outer threaded tube 16.

The free end 24 of the base 12 is provided with an integral first mounting portion, in the form of a bushing 26 for mounting to the chassis of a vehicle (not shown) and the free end 28 of the inner cylindrical tube 22 is provided with a second mounting assembly in the form of a bushing 30 for mounting to the wheel seat of the vehicle (not shown).

Since mounting assemblies 26 and 30 are believed to be well-known in the art, they will not be described herein in more detail for concision purposes.

Also, as will be shown hereinbelow with reference to further illustrative embodiment, the mounting assemblies 26 and 30 are not limited to the illustrated embodiment thereof.

As it is believed to be well-known in the art, the two nested threaded tubes 16 and 22 define together a damping mechanism by the use of a compressed gas or a viscous liquid such as oil. Since such a damping mechanism is believed to be well-known in the art, it will not be described herein in more detail for concision purposes.

According to another embodiment, another tube arrangement or mechanism (not shown) is provided to yield the damping effect.

The outer threaded tube 16 is threaded along most of its length including the first longitudinal end 18 thereof. The tube 16 is received in the base 12, which is complementary threaded.

The screwed assembly of the outer threaded tube 16 to the base 12 allows adjusting the overall length of the shock absorber 10 during its installation or afterwards, wherein a lock ring 32 is provided to lock a selected position thereof.

While the base 12 is illustrated as having a cylindrical section, it can have a section that is rectangular in shape or that has another geometry, providing that the base 12 has an inner threaded hollow portion to receive the outer tube 16.

The cylindrical hollow base 12 includes a longitudinal slot 34 that defines a window therein to visualize the longitudinal position of the outer threaded tube 16 in the base 12, and more specifically of the first longitudinal end 18 thereof. Such a longitudinal position is indicative of the extension of the shock absorber 10.

A scale 36, or another indicium, is provided on a first lateral side of the slot 34. The scale 36 acts as references for the position of the first longitudinal end 18 of the outer tube 16 within the base 12. The scale 36 can be engraved or printed onto the base 12. According to the first illustrative embodiment, the scale 36 includes a reference mark CM', which indicates the highest secure position for the first longitudinal end 18 of the outer tube 16 in the base 12. Such highest secure position is predetermined based on the overall configuration of the shock absorber 10 and safety criteria. It is believed to be within the reach of a person skilled in the art to determine such highest secure position. According to another embodiment, such a reference mark is omitted or takes another form.

The window 34 is provided as a visual reference for the user when adjusting the length of the shock absorber 10.

As will become more apparent upon reading the following description of further illustrative embodiment, the configurations and number of windows are not limited to the window 34.

Turning now to FIGS. 3 and 4, a shock absorber 40 according to a second illustrative embodiment will now be described. Since the shock absorber 40 is similar to the shock absorber 10, only the differences therebetween will be described herein for concision purposes.

The cylindrical hollow base 42 of the shock absorber 40 includes a window 44 to visualize the outer threaded tube 16, which is in the form of an elongated slot practiced therein along the longitudinal direction. One of the two lateral sides of the slot 44 is serrated, defining a reference scale. While the hollow base 42 is free of indicia along the slot 44, such indicia can alternatively be added.

Also, the configurations of the second mounting assembly 46 and of the inner cylindrical tube 47 differ than those of the shock absorber 10.

Furthermore, the shock absorber 40 is provided with a spring 48, which is mounted between a second lock ring 49, mounted to the outer threaded tube 16, and the second mounting assembly 46.

With reference to FIGS. 5 and 6, a shock absorber 50 according to a third illustrative embodiment will now be described. Since the shock absorber 50 is similar to the shock absorber 40, only the differences therebetween will be described herein for concision purposes.

The shock absorber 50 includes a second mounting assembly 30 for mounting to the wheel seat of the vehicle (not shown), and an inner cylindrical tube 22, which are identical to those of the first illustrative embodiment.

The shock absorber 50 further differs from the shock absorber 40 by its cylindrical hollow base 52 which includes integral mounting elements 54 and 56 to secure the shock absorber to the vehicle chassis (not shown).

Furthermore, the base 52 includes two co-linear longitudinal slots 58-60, defining windows to visualize the longitudinal position of the outer threaded tube 16 in the base 52.

A scale 62, or another indicium, is provided on a same lateral side of both slots 58-60.

According to another embodiment (not shown), one or both of the slots 58-60 are configured differently than illustrated. For example, the slots can be longer, larger or differently shaped. The number of slots or their relative positions may also differ than illustrated.

The number and configuration of the mounting elements to secure the shock absorber to the vehicle may also be different than illustrated.

FIG. 7 shows a cylindrical hollow base 70 according to a fourth illustrative embodiment. Since the hollow base 70 is similar to the base 52, only the differences therebetween will be described herein in more detail for concision purposes.

The base 70 includes a plurality of windows 72-84 to visualize the longitudinal position of the outer cylindrical tube (not shown) screwed therein. Each of the windows 72-84 is in the form of a rounded hole. An indicium, such as a letter, is engraved or printed adjacent each hole 72-84 to act as a reference for each hole 72-84.

According to another embodiment, some or all the indicia are different or omitted. According to still another embodiment, some or all of the holes 72-84 have a different shape than circular.

It is to be noted that many modifications could be made to the shock absorbers 10, 40 and 50 and to the cylindrical hollow base 70 described hereinabove and illustrated in the appended drawings. For example:

the configuration and size of the outer and inner tubes may be different than illustrated; and the configuration, size and number of the mounting elements may be different than illustrated.

Although a shock absorber and a base for mounting a shock absorber to a vehicle chassis have been described hereinabove by way of illustrated embodiments thereof, it can be modified. It is therefore to be understood that numerous modifications may be made to the illustrative embodiments and that the scope of the claims should not be limited by the preferred embodiment, but should be given the broadest interpretation consistent with the description as a whole.

What is claimed is:

1. A shock absorber comprising:
   a threaded outer axial tube, having first and second longitudinal ends, and
   an inner axial tube slidably mounted into the threaded outer axial tube therein; the inner axial tube having a first mounting portion for securing the inner axial tube to a vehicle;
   a base for mounting the threaded outer axial tube to the vehicle, the base including a body having
   i) a second mounting portion for securing the body to the vehicle,
   ii) a cylindrical hollow portion having a threaded inner surface, and
   iii) an opening in the cylindrical hollow portion that defines an access thereto for screwing the threaded outer axial tube therein via the first longitudinal end thereof; the cylindrical hollow portion having a window capable of visualizing the first longitudinal end of the threaded outer axial tube therein.

2. The shock absorber as recited in claim 1, wherein the window is elongated and is oriented along the axial direction.

3. The shock absorber as recited in claim 1, wherein the window is in the form of a serrated slot.

4. The shock absorber as recited in claim 1, wherein an outer surface of the body includes at least one indicium adjacent the window.

5. The shock absorber as recited in claim 4, wherein the at least one indicium is a scale.

6. The shock absorber as recited in claim 4, wherein the at least one indicium is engraved or printed onto the outer surface of the body.

7. The shock absorber as recited in claim 4, wherein the at least one indicium includes a reference to a maximum height.

8. The shock absorber as recited in claim 1, wherein the window is defined by a plurality of openings.

9. The shock absorber as recited in claim 8, wherein the plurality of openings are colinear.

10. The shock absorber as recited in claim 1, wherein window is defined by at least one rounded hole.

11. The shock absorber as recited in claim 1, wherein the mounting portion is integral to the cylindrical hollow body.

* * * * *